Figure 1:
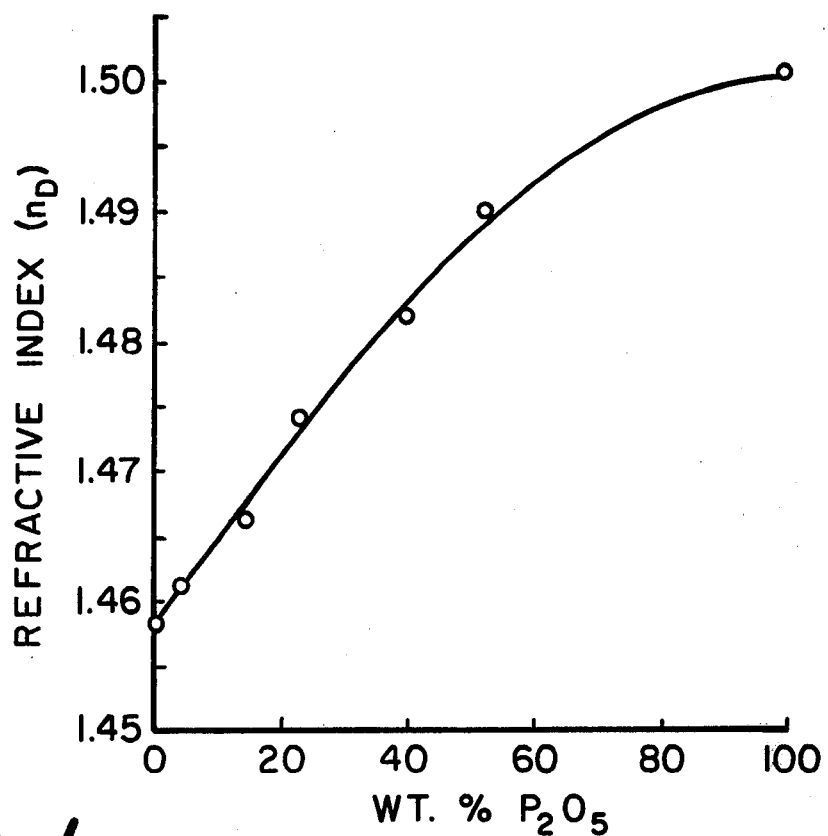

United States Patent [19]

Schultz

[11] 4,042,404
[45] Aug. 16, 1977

[54] FUSED $P_2O_5$ TYPE GLASSES

[75] Inventor: Peter C. Schultz, Painted Post, N.Y.

[73] Assignee: Corning Glass Works, Corning, N.Y.

[21] Appl. No.: 675,959

[22] Filed: Apr. 12, 1976

Related U.S. Application Data

[63] Continuation-in-part of Ser. No. 321,109, Jan. 4, 1973, abandoned.

[51] Int. Cl.² .................. C03C 3/04; C03B 25/00; C03B 23/20
[52] U.S. Cl. .................................. 106/52; 65/18; 65/3 A; 65/120; 65/60 D; 65/DIG. 16
[58] Field of Search ............. 65/DIG. 16, 120, 60 D, 65/3 A, 17, 18; 106/52

[56] References Cited

U.S. PATENT DOCUMENTS 3,849,344  11/1974  McMurtry et al. ............. 106/52 X Primary Examiner—S. Leon Bashore
Assistant Examiner—Frank W. Miga
Attorney, Agent, or Firm—Clinton S. Janes, Jr.; Clarence R. Patty, Jr.

[57]  ABSTRACT

Fused oxide type glasses produced by flame hydrolysis are described. These glasses are composed of $P_2O_5$ and, optionally, $SiO_2$. $P_2O_5$ is present in an amount of at least 2% by weight.

2 Claims, 2 Drawing Figures

FUSED P₂O₅ TYPE GLASSES

This application is a continuation-in-part of co-pending Ser. No. 321,109, filed Jan. 4, 1973, and now abandoned.

The instant invention relates to fused oxide type glasses produced by the flame hydrolysis technique. It is more particularly concerned with such glasses composed, at least in substantial part, of $P_2O_5$.

The flame hydrolysis technique was originally developed as a method of producing pure silica particles. If desired, these particles might then be vitrified to form a transparent glass composed essentially completely of $SiO_2$. The technique comprises passing the vapor of a hydrolyzable compound, e.g., silicon tetrachloride, through a burner into a flame of combustible gas to hydrolyze the vapor and decompose the hydrolysis product to form the corresponding oxide.

U.S. Pat. No. 2,272,342, granted Feb. 10, 1942 to J. F. Hyde, discloses the basic practical considerations and theoretical concepts involved in the flame hydrolysis process for making fused silica glass. As is explained therein, the hydrolysis product can be collected in particulate form which is then consolidated or vitrified through further heat treatment. Or, alternatively, the silica material can be collected in a furnace or other closed chamber operating at a sufficiently high temperature to effect concurrent consolidation of the material into a glass body. In essence, this latter technique provided a single-step process wherein collection of the hydrolysis product and consolidation thereof were achieved substantially simultaneously. The resulting economic efficiencies inherent in this single-step technique led to it becoming the standard commercial process for the large scale production of fused silica bodies with a specific caveat being issued against even minute traces of contaminants being present.

Thus, as is described in U.S. Pat. No. 2,272,342, supra, the oxide particles resulting from flame hydrolysis may be collected in particle form (known as soot) and used as fillers, extenders, pigments, and the like. They may also be pressed in a mold or collected on a mandrel, to form a shape that can be consolidated and vitrified by further heat treatment.

In the conventional commercial practice, a fused silica glass body is formed by directly depositing particles in vitreous form on a base rotated in a chamber heated to a temperature in the range of 1750°-1850° C. In this way the particles are collected as a solid body or boule of clear transparent glass in a single step.

The desirability of introducing small amounts of additive oxides into the fused silica glass (known as doping) quickly becomes apparent. Techniques based on using mixed vapors are described in U.S. Pat. No. 2,239,551, granted Apr. 22, 1941 to R. H. Dalton et al., and U.S. Pat. No. 2,326,059, granted Aug. 3, 1943 to M. E. Nordberg. A more recent patent, U.S. Pat. No. 3,334,982, granted Aug. 8, 1967 to R. Mattmuller, describes glasses produced in this manner which are stated to contain different additives including up to 0.5% germania ($GeO_2$).

It is customary to report glass compositions on an oxide basis. In a multicomponent glass, the proportions are calculated on the basis of, or corresponding to, a raw material batch from which the glass is melted. In the case of fused oxide type glasses produced by the flame hydrolysis technique, the raw materials, typically, are chloride vapors. Accordingly, unless otherwise indicated, the relative proportions of oxides in a mixed oxide glass of this type are calculated in conventional manner from the relative amounts of chloride vapors fed to the burner flames.

The present invention arose from efforts made to study fused silica glasses produced by direct vitrification and containing a variety of different dopants. These glasses included, inter alia, fused silica glasses containing phosphorus pentoxide ($P_2O_5$) as a dopant. Substantial quantities of phosphorus trichloride or phosphorus oxychloride could be admixed with silicon tetrachloride either as liquid or vapor. However, it was unexpectedly found that the resulting fused silica glass invariably contained less than 0.1% $P_2O_5$ regardless of the amount of phosphorus trichloride or phosphorus oxychloride supplied to the mixture. For example, a chloride mixture, proportioned to produce a binary fused silica glass containing 25% by weight $P_2O_5$, actually produced a glass containing only about 0.13% by weight $P_2O_5$, as determined by chemical analysis.

It may be theorized that the combustion flame temperature, combined with the overall furnace temperature of 1750°-1850° C., is sufficiently high that the oxides concerned tend to volatilize rather than vitrify. Available vapor pressure data tend to support such a theory. However, such data also predict similar volatilization, at least to a substantial degree, at the lower temperatures successfully used in accordance with the present invention. In any event, it was not possible to produce the present glasses by conventional fused silica production processes.

It is, of course, known to produce binary $P_2O_5$—$SiO_2$ glasses by the conventional batch melting procedure. A particular feature of fused oxide type glasses produced by flame hydrolysis, however, is an impurity level considerably lower than that normally attainable in ordinary melted glasses. For example, fused silica type glasses are produced by this process with a cation impurity level below 10 parts per million (PPM). In contrast, the impurity level in even relatively pure melted glasses will be in the range of 0.01 to 0.1 weight percent, i.e., 100 to 1,000 PPM. The term impurity has its normal meaning as referring to a material that is not intentionally added and generally has an adverse effect upon the desirable properties of a product. Of particular concern are transition metal ions, e.g., iron, which seriously interfere with optical transmission.

I have now discovered that fused oxide type glasses containing $P_2O_5$ can be produced despite the fact that the conventional process of direct vitrification and collection has proven quite impractical with respect to this oxide. More particularly, I have found that such fused oxide glasses can be produced by depositing the oxide particles as a porous vitreous body and then consolidating this porous preform to a solid nonporous body. The temperature must not exceed about 1450° C. in any case and should be maintained, during consolidation, within a range varying between the minimum consolidation temperature of a particular glass and about 200° C. thereabove.

U.S. Pat. No. 3,644,607, granted Feb. 22, 1972 to R. A. Roques et al., describes the fabrication of two-ply laminated articles wherein each layer is produced through flame (vapor phase) hydrolysis. The single working example provided disclosed a first layer of fused silica glass and an overlaying lamina of $TiO_2$-doped fused silica glass. A two-step method for forming the final laminated product is described, but no teaching of any temperature control to be undertaken during each step is provided. The patentees observed that during the first step the mandrel upon which the particulate material is collected will preferably not reach a temperature over 300° C. and the metal oxide being deposited will preferably not be brought above its fusion temperature during deposition. No temperature specification whatever is mandated for the consolidation (sintering) step with temperatures ranging between 1400°–1800° C. being mentioned.

The patentees noted that metal oxides from Groups II-A, III-A, IV-A, III-B, IV-B, and V-B of the Periodic Table were operable in their invention. Phosphorus is a member of Group V-A.

My invention is a fused oxide type glass produced by the flame hydrolysis technique consisting of $P_2O_5$ alone or in combination with $SiO_2$, wherein $P_2O_5$ is present in an amount of at least 2% by weight, as determined through chemical analysis, and containing less than 10 PPM cation impurities. The invention further comprehends the method of producing such glass which comprises introducing into the flame of a combustion burner the vapor of a compound of phosphorus that is capable of being converted to the corresponding oxide in the flame of such burner, introducing such compound into the flame of the burner, either alone or in conjunction with a compound capable of being converted to $SiO_2$ in such flame, converting the compounds to oxide particles in the flame, collecting such particles on a support to form a porous, particulate, preform body, and subsequently consolidating such preform by heat treatment at a temperature not exceeding about 1450° C.

The simplest form of the invention is a glass composed entirely of $P_2O_5$. Such glass may be produced from any vaporizable compound that hydrolyzes and converts to the oxide in a combustion burner flame. Normally, the chloride is employed because of ready availability, convenience, and cost. However, other suitable compounds will be readily apparent to one familiar with the chemistry of these materials. A compatible carrier gas is passed through a container of the chloride, or other selected vaporizable compound, to entrain the compound in vapor form and carry it to the combustion burner. The gas-vapor mixture is passed into the burner and through the burner flame to be hydrolyzed and decomposed to the corresponding oxide.

Nevertheless, whereas a glass consisting solely of $P_2O_5$ can be produced, the utility therefor is sharply limited due to the physical properties exhibited thereby. Thus, the glass has a softening point of less than 100° C. and is quite hygroscopic. This latter characteristic is especially disadvantageous since the glass is actually unstable in the ambient air at room temperature. In view of those circumstances, the preferred glasses will consist essentially of $P_2O_5$ and $SiO_2$, with the $P_2O_5$ content not exceeding about 50% by weight. Various dopants can, of course, be added in accordance with conventional practice.

The present manufacturing practice, wherein the oxide particles are deposited to produce a transparent glass body directly, is quite impractical for the inventive glasses. It is possible, by close temperature control, to collect a small amount of an oxide in vitreous form, but the amount lost is too large for such procedure to be practical. Further, any attempt at composition control in a mixture is extremely difficult.

Rather, the oxide (or oxides) must be collected in particulate form as a porous preform body composed of densely-packed, vitreous particles. This may be accomplished in a heated chamber, providing that undue vaporization of $P_2O_5$ is avoided. However, the particles may also be collected at room or ambient temperature, and this is generally preferable for obvious reasons.

The particulate, porous preform body thus formed is now consolidated to a nonporous, vitreous body of corresponding shape but of smaller size by heat treatment. In accordance with the present invention, the temperature of such treatment must not exceed 1450° C. Furthermore, it should not exceed the temperature range extending about 200° C. above the minimum temperature at which a body composed of particulate, vitreous oxide particles can be consolidated to a nonporous vitreous body within a reasonable time.

The temperature limitation is particularly important in producing single oxide glasses in accordance with the invention since there is no interaction or bonding with $SiO_2$ that can inhibit oxide loss. Accordingly, the $P_2O_5$ simply fails to deposit and is lost at higher temperatures.

In practicing the present invention, it is desirable to consolidate the porous preform by gradually passing the preform through a zone or line of maximum temperature. In this manner, the body is gradually consolidated from one extremity to another with gases in the pores progressively being forced out of the body and not trapped therein. This insures a clear, transparent body without physical defects that might interfere with smooth light transmission.

Figure 2:
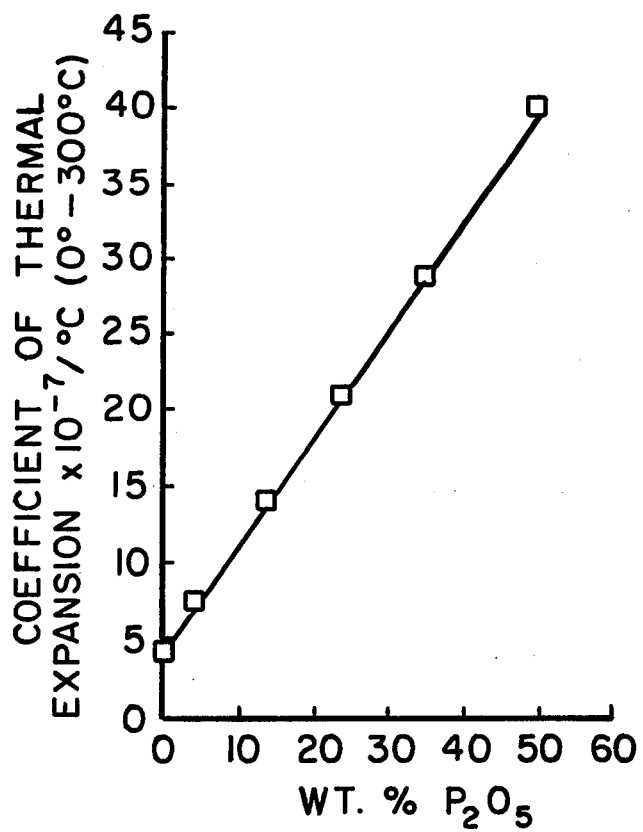

The invention is further described, by way of illustration rather than limitation, with reference to specific embodiments thereof and with reference to the accompanying drawing wherein:

FIG. 1 is a graphical illustration showing the relationship between refractive index and oxide proportions in $P_2O_5$—$SiO_2$ glass systems, and FIG. 2 is a graphical illustration showing the relationship between the coefficient of thermal expansion (0°–300° C.) and oxide proportions in the $P_2O_5$—$SiO_2$ system up to 50% by weight $P_2O_5$.

Fused oxide glasses in the $P_2O_5$—$SiO_2$ binary system are of particular interest because of the relatively rapid rate at which the glass refractive index increases with increased proportion of $P_2O_5$ to $SiO_2$ in the glass composition. This is of particular interest in the production of fiber optic elements in which glasses of differing refractive indices are combined to achieve the desired light transfer in known manner. At the same time, it is highly desirable to use glasses having similar chemical compositions and other physical properties, as well as extremely high chemical purity.

Heretofore, glasses in the $TiO_2$—$SiO_2$ system have been employed. However, as described in United Kingdom Specification No. 1,213,603, granted Apr. 23, 1971 to Corning Glass Works, these have no been entirely satisfactory because of the instability of the titanium ion valence state. The $P_2O_5$—$SiO_2$ system glasses avoid this type of instability.

FIG. 1 of the drawing is a graphical illustration wherein the weight percent of $P_2O_5$ in $P_2O_5$—$SiO_2$ glasses is plotted along the horizontal axis. Thus, the horizontal axis depicts glasses varying in composition from pure $SiO_2$ at the left-hand side of the graph to pure $P_2O_5$ at the right-hand side of the graph. The refractive index at the wavelength of the sodium D line ($n_D$) is plotted along a vertical axis of the graph. Specific glass compositions upon which actual refractive index measurements have been made are indicated by small circles on the graph.

FIG. 2 is a graphical representation of the manner in which the coefficient of thermal expansion, measured over the range of 0°–300° C., varies with glasses of the $P_2O_5$—$SiO_2$ binary. The weight percent of $P_2O_5$ in the composition is plotted along the horizontal axis and the coefficient ($\times 10^{-7}/°$ C.) delineated along the vertical axis. Measurements are indicated by small squares.

The production of glasses, such as referred to in FIGS. 1 and 2, is illustrated by reference to a specific glass composed of approximately 12% by weight of $P_2O_5$ and 88% $SiO_2$.

A stream of dry nitrogen was bubbled at a rate of 925 cc/min. through a flask of phosphorus oxychloride ($POCl_3$) held at a temperature of 60° C. A stream of dry oxygen was bubbled at a rate of 940 cc/min. through a flask of silicon tetrachloride ($SiCl_4$) held at 35° C. The two streams were combined, the mixture piped to a combustion burner, and passed through the burner into the flame of a natural gas-oxygen mixture fed to the burner. The chloride and oxychloride vapors were hydrolyzed and decomposed in the flame to form a $P_2O_5$—$SiO_2$ soot, or oxide particle mixture, having a composition of approximately 12% by weight $P_2O_5$ and 88% by weight $SiO_2$.

A fused silica rod 5 inches in length and 5 mm. in diameter was positioned 6.5 inches from the face of the burner as a support upon which the oxide, or soot, particles were deposited from the flame. This fused silica support was mounted in a suitable holder so that it was rotated at 250 rpm., and, at the same time, translated back and forth under the burner at a rate of 7 inches per minute. In this manner, a uniform deposition of soot took place over the surface of the support rod. The soot was deposited for a period of two hours to form a dense, porous preform body approximately 1 inch in diameter and 5 inches in length.

The oxide deposition was then discontinued, the preform removed and introduced into an electric furnace. The furnace was maintained at a maximum temperature of 1100° C., with a helium atmosphere, and the preform was retained therein for about 45 minutes. The result was a clear, high quality glass substantially free from gaseous inclusions and having a diameter of about 0.75 inch and a length of about 5 inches.

A fused silica support was employed for collection of the oxide particles because of its low coefficient of expansion. Such material is customarily used in collecting oxide soot for glasses containing up to about 30% by weight $P_2O_5$. With larger amounts, the glass expansion increases sufficiently so that it is preferable to employ a graphite, alumina, or mullite ($3Al_2O_3.2SiO_2$) supporting member. FIG. 2 illustrates the rapid increase in coefficient of thermal expansion as higher percentages of $P_2O_5$ are incorporated in the product. A study of that Figure enables the glass technologist to determine the proper supporting member to be used with the composition of the desired product.

The following table sets forth data for several additional glasses exemplary of the invention. A mixture of raw materials was employed and the third column in the table illustrates the composition of the mixture in weight percent. The second column reports the temperature of the raw material mixtures. Dry nitrogen was utilized as the carrier gas in each example and a natural gas-oxygen mixture provided the source of the flame. In each instance, a preform was produced and the fourth column of each table states the temperature, in degrees C., at which this preform was thermally vitrified to a clear glass. Finally, the oxide system and the analyzed composition of each glass produced, in percent by weight on an oxide basis, is shown for each example.

Whereas a natural gas-oxygen mixture provided the flame in the reported examples, it will be appreciated that other sources well-known to the art are likewise effective. Such useful materials can include, but are not limited to, mixtures of carbon monoxide and oxygen, cabon disulfide and oxygen, cyanogen and oxygen, hydrogen and oxygen, and acetylene and oxygen. A plasma-type flame can also be utilized. Where a very dry glass is desired, a hydrogen-free source will be employed.

TABLE

| Raw Materials | Temp., ° C. | Mixture Composition | Temp., ° C. Sinter | Oxide System | Analyzed Comp. Wt.% |
|---|---|---|---|---|---|
| $SiCl_4/PCl_3$ | 35 | 22.37/77.63 | 1300 | $SiO_2/P_2O_5$ | 62.1/37.9 |
| $SiCl_4/PCl_3$ | 35 | 39.33/60/67 | 1300 | $SiO_2/P_2O_5$ | 52.6/47.4 |
| $SiCl_4/PCl_3$ | 35 | 77.94/22.06 | 1440 | $SiO_2/P_2O_5$ | 77.5/22.5 |
| $SiCl_4/PCl_3$ | 35 | 6.65/93.35 | 1350 | $SiO_2/P_2O_5$ | 47.0/53.0 |

Applicant is not prepared to positively explain the circumstances that render his present invention effective. Differential volatility may be advanced as an explanation. However, vapor pressure data do not fully support this. Thus, the approximate boiling point of $P_2O_5$ is 600° C. and the approximate temperature corresponding to a vapor pressure of 100 mm. Hg for $P_2O_5$ is 500° C.

It will be appreciated that a vapor pressure of 100 mm. Hg is sufficiently high that substantial volatilization should also be expected at a temperature corresponding to that pressure. Nevertheless, this expected loss is not encountered when, for example, $P_2O_5$—$SiO_2$ glasses are consolidated at a temperature corresponding to such vapor pressure.

It is Applicant's belief that volatilization does tend to occur in the single oxide type glass, e.g., a pure $P_2O_5$ glass. Hence, it is necessary to minimize both the collection and the consolidation temperatures to avoid material loss. In particular at temperatures greater than 200° C. above the minimum consolidation temperature, the degree of loss becomes so great that collection and/or consolidation are impractical.

Contrary to this, however, it is believed that volatilization loss, to a substantial extend at least, does not occur in the $P_2O_5$—$SiO_2$ system, depite the fact that vapor pressure is relatively high at the consolidating temperature. It is believed that an interaction or interbonding occurs that limits volatilization. Thus, the $P_2O_5$—$SiO_2$ glass may be consolidated at 1450° C. without the expected loss. However, as the temperature is further increased this bond weakens and is lost rapidly, with the result that substantially complete loss of $P_2O_5$ can readily occur above 1600° C.

It will be understood that the 1450° C. maximum consolidation temperature does not imply that all glasses can be successfully consolidated at or near this temperature without severe softening and deformation. Thus, the addition of $P_2O_5$ to $SiO_2$ rapidly depresses the minimum consolidation temperature of pure $SiO_2$. Hence, as was noted above, the softening point of pure $P_2O_5$ glass is less than about 100° C. Therefore, the minimum consolidation temperature for a particular $SiO_2$—$P_2O_5$ composition will be determined empirically, and such is self-evidently within the ordinary skill of the glass technologist.

I claim:

1. A method for making a transparent fused oxide type glass exhibiting a refractive index between about 1.46–1.49 and a coefficient of thermal expansion (0°–300° C.) of about 5–40 × $10^{-7}$/° C. consisting essentially, by weight, of 2–50% $P_2O_5$ and the remainder $SiO_2$, and having a cation impurity level not exceeding 10 PPM, which comprises the steps
   a. entraining a vaporizable compound capable of being converted by flame hydrolysis and decomposition to $P_2O_5$ and a vaporizable compound capable of being converted by flame hydrolysis and decomposition to $SiO_2$ in a gas stream;
   b. passing said gas stream into the flame of a combustion burner to cause the interbonding of $P_2O_5$ and $SiO_2$ into vitreous particles of fused $P_2O_5$—$SiO_2$ such that volatilization of $P_2O_5$ and $SiO_2$ is limited;
   c. collecting said vitreous particles at a temperature below the minimum consolidation temperature as a porous preform body; and then
   d. heating said porous preform body to a temperature within the range of minimum consolidation temperature of said vitreous particles and 200° C. thereabove, but not in excess of 1450° C., to consolidate said porous preform body to a non-porous glass body.

2. A fused oxide type glass produced in accordance with claim 1.

* * * * *

UNITED STATES PATENT AND TRADEMARK OFFICE
CERTIFICATE OF CORRECTION

PATENT NO. : 4,042,404

DATED : August 16, 1977

INVENTOR(S) : Peter C. Schultz

It is certified that error appears in the above-identified patent and that said Letters Patent are hereby corrected as shown below:

Column 2, line 4, "flames," should be -- flame. --.

Column 4, line 35, "drawing" should be -- drawings --.

Column 4, line 52, "sitions" should be -- sition --.

Column 4, line 68, "a" should be -- the --.

Column 5, line 13, delete "of".

Signed and Sealed this

Twenty-eighth Day of February 1978

[SEAL]

Attest:

RUTH C. MASON
Attesting Officer

LUTRELLE F. PARKER
Acting Commissioner of Patents and Trademarks